Figure 1:
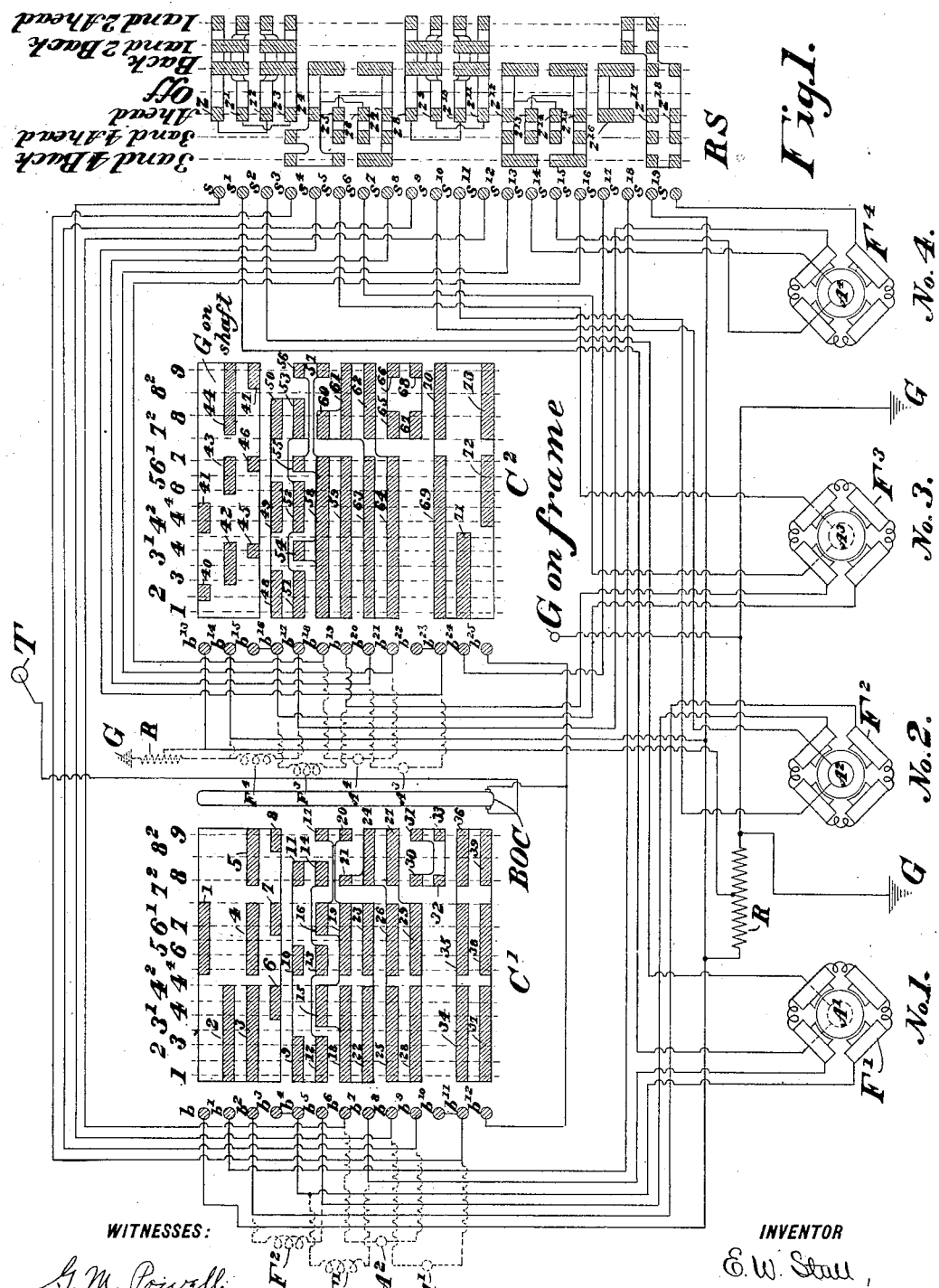

No. 672,992. Patented Apr. 30, 1901.
E. W. STULL.
CONTROLLER FOR ELECTRIC MOTORS.
(Application filed July 25, 1900.)
(No Model.) 3 Sheets—Sheet 1.

WITNESSES:
G. M. Powell.
Blanche M. Smith.

INVENTOR
E. W. Stull,
BY Geo. H. Parmelee,
his ATTORNEY.

No. 672,992. Patented Apr. 30, 1901.
E. W. STULL.
CONTROLLER FOR ELECTRIC MOTORS.
(Application filed July 25, 1900.)
(No Model.) 3 Sheets—Sheet 3.

Fig. 2.a.

WITNESSES:
G. M. Powell
Blanche M. Smith

INVENTOR
E. W. Stull,
BY
Geo. H. Parmelee,
his ATTORNEY.

UNITED STATES PATENT OFFICE.

EMMETT W. STULL, OF JOHNSTOWN, PENNSYLVANIA, ASSIGNOR TO THE LORAIN STEEL COMPANY, OF PENNSYLVANIA.

CONTROLLER FOR ELECTRIC MOTORS.

SPECIFICATION forming part of Letters Patent No. 672,992, dated April 30, 1901.

Original application filed June 8, 1900, Serial No. 19,641. Divided and this application filed July 25, 1900. Serial No. 24,771.

(No model.)

*To all whom it may concern:*

Be it known that I, EMMETT W. STULL, of Johnstown, in the county of Cambria and State of Pennsylvania, have invented a new and useful Improvement in Controllers for Electric Motors, of which the following is a full, clear, and exact description, reference being had to the accompanying drawings, which form a part of this specification.

This invention has relation to apparatus for the control of electric motors, and more particularly to apparatus for carrying into effect the novel method of control described and claimed in my pending application for patent, Serial No. 19,641, filed June 8, 1900, of which the present application is a division. That method of control consists, broadly, in starting a plurality of motors (four or more) connected all in series and then changing them over to a relation in which they are all in parallel by certain intermediate steps in which the motors or motor elements are partly in series and partly in parallel, the control being effected mainly by utilizing the resistance and counter electromotive force of the motors themselves, thereby dispensing to a great extent, if not altogether, with the use of wasteful external resistance.

The present invention consists, therefore, broadly considered, in a motor-controller consisting of a plurality of controlling elements or groups of contacts, each of which is arranged to control one group of motors and is provided with contacts for connecting the motors of that group both in series and in parallel and also the fields and armatures alone in series and in parallel, means being also provided for connecting said controlling elements themselves both in series and in parallel. These controlling elements also preferably have contacts so arranged as to make other minor circuit changes preparatory to the essential or running positions, whereby two abrupt changes in circuit conditions are avoided and the motor-circuit is not entirely broken at any time.

My invention also includes a reversing and cut-out switch for reversing the motors and also for cutting out of circuit either group of motors at will and having its contacts and connections so arranged as to obviate the necessity of duplicating certain contacts of the controlling elements and enabling the contact arrangement and connections of said elements to be materially simplified.

My invention also consists in the novel construction and combination of parts, all as hereinafter described, and pointed out in the appended claims.

In the further description of my invention reference will be had to the accompanying drawings, forming a part of this specification.

Figure 2:
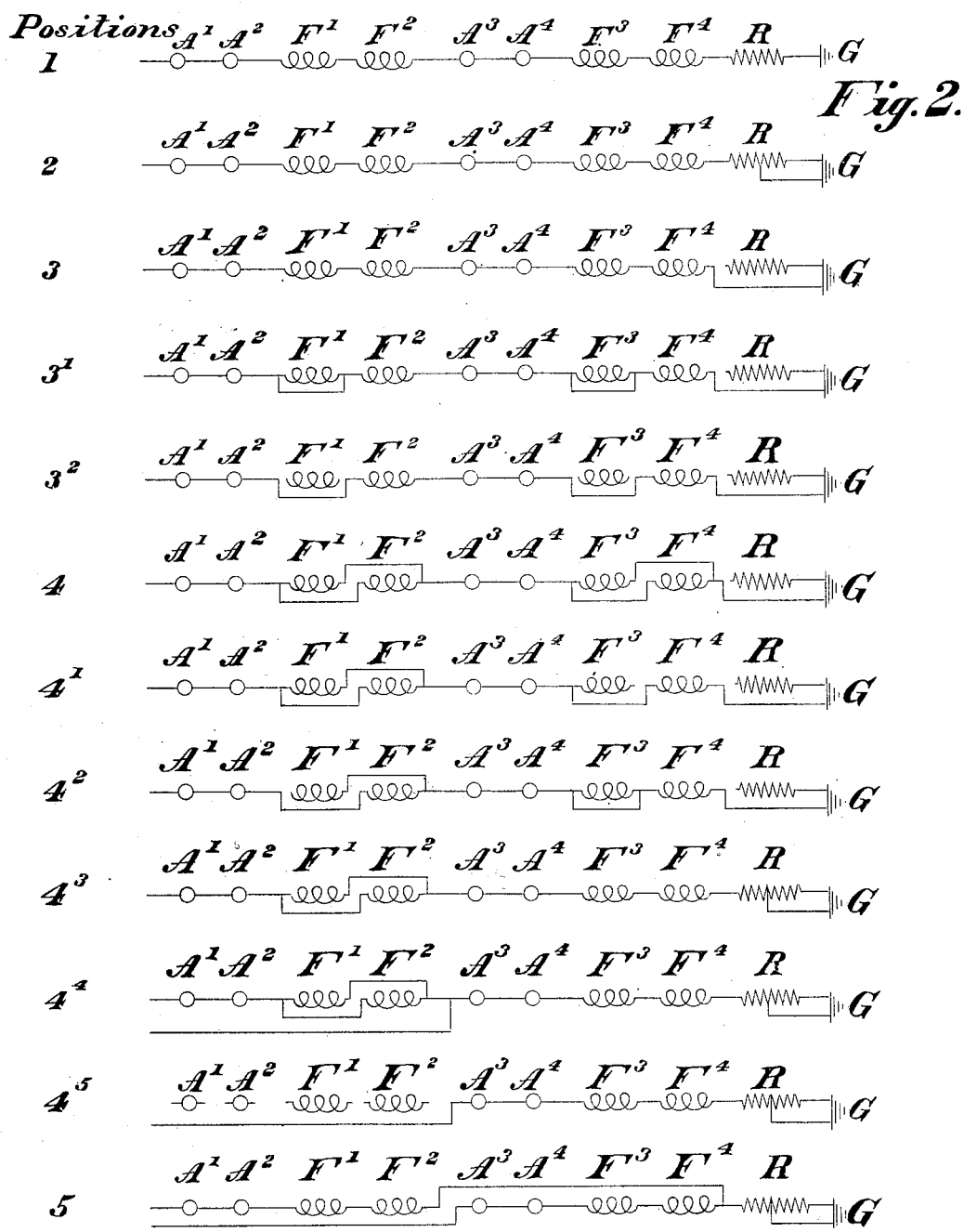
Figure 3:
Figure 3:
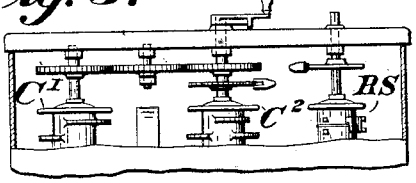

In the drawings, Figure 1 is a planular development or diagram of controlling apparatus suitable for the practice of my invention. Figs. 2 and 2$^a$ are views showing graphically the circuit conditions which are effected in the several positions of the controller, Fig. 2$^a$ being a continuation of Fig. 2; and Fig. 3 is a partial elevation of a controller with the casing broken away.

In Fig. 1, to which reference will first be made in order to facilitate tracing the circuits at the different positions of the motors, I have in addition to the full diagrammatic representation of the circuits indicated graphically in dotted lines the connection of the several motor elements between the fixed contacts of the controller.

A' A$^2$ A$^3$ A$^4$ designate, respectively, the armatures of the four electric motors No. 1, No. 2, No. 3, and No. 4, and F' F$^2$ F$^3$ F$^4$ the field-coils of the same.

C' C$^2$ designate the two main moving elements of the controller, and RS the reversing and cut-out switch.

R designates artificial resistance for connection in circuit with the motors under certain conditions.

B O C is a blow-out coil.

G wherever seen indicates a ground connection, and T indicates the trolley or other connection to the high-pressure side of the supply-circuit.

The members C' C$^2$ are preferably revolving drums of the well-known type, drum C' having the contacts 1 to 39, inclusive, and drum C$^2$ the contacts 40 to 73, inclusive.

$b$ $b'$ $b^2$, &c., to $b^{12}$, inclusive, designate the fixed contact-fingers, which coöperate with the contacts of the drum C', and $b^{13}$ to $b^{25}$, inclusive, indicate the fingers, which coöperate with the contacts of drum $C^2$. The reversing-switch also has a plurality of contacts arranged in six vertical lines corresponding to six different positions of the switch, indicated, respectively, on the drawings "Ahead," "3 and 4 ahead," "3 and 4 back," "Back," "1 and 2 back," and "1 and 2 ahead." Between the main-ahead and back positions is an open circuit or off position. The only contacts of this switch which it will be necessary to refer to in detail in tracing the circuits hereinafter are those on the main-ahead position and designated $z$ $z'$ $z^2$, &c., to $z^{18}$. The fixed coöperating contact-fingers of this switch are designated $s$ $s'$ $s^2$, &c., to $s^{19}$.

The relative arrangement, grouping, and connections of the various movable contacts and the circuit connections of the several fixed contacts will be best understood by reference to Fig. 1, on which they are clearly indicated, and detailed description thereof is therefore unnecessary. Attention will, however, be called hereinafter to certain peculiar features in the contact arrangement and the purpose thereof made clear.

The two drums or cylinders C' $C^2$ are intergeared to revolve in unison by the operation of a single handle H, as shown in Fig. 3.

Assuming the fingers of the reversing-switch to stand on the line of contacts marked "Ahead" and the drums C' $C^2$ to have been moved to position 1, the circuit is as follows: from trolley to blow-out coil B O C, to finger $b^{12}$, contacts 37 34, finger $b^{11}$, finger $s^3$, contacts $z^3$ $z'$, armature A', finger $s^2$, contacts $z^2$ $z$, finger $s$, finger $b^8$, contacts 25 28, finger $b^9$, finger $s^8$, contacts $z^8$ $z^{10}$, finger $s^{10}$, armature $A^2$, finger $s^9$, contacts $z^9$ $z^{11}$, finger $s^{11}$, finger $b^6$, contacts 18 and 22, finger $b^7$, field F', finger $b^4$, contacts 9 and 12, finger $b^5$, field $F^2$, finger $b^2$, contacts 3 and 2, finger $b'$, finger $s^{17}$, contact $z^{16}$, finger $^{16}$, finger $b^{24}$, contacts 71 69, finger $b^{23}$, finger $s^4$, contacts $z^4$ $z^6$, finger $s^6$, armature $A^3$, finger $s^5$, contacts $z^5$ $z^7$, finger $s^7$, finger $b^{20}$, contacts 63 64, finger $b^{21}$, finger $s^{12}$, contacts $z^{12}$ $z^{14}$, finger $s^{14}$, armature $A^4$, finger $s^{13}$, contacts $z^{13}$ $z^{15}$, finger $s^{15}$, finger $b^{18}$, contacts 58 59, finger $b^{19}$, field $F^3$, finger $b^{16}$, contacts 48 and 51, finger $b^{17}$, field $F^4$, finger $s^{19}$, contacts $z^{18}$ $z^{17}$, finger $s^{18}$, to and through resistance R to ground. The four motors are therefore all connected in series with each other and with resistance. Each drum C' $C^2$, it will be seen, controls through the reversing-switch the connections of two of the motors, and the two drums are at this time connected in series through the said switch. In position 2 the only change made is due to the engagement of finger $b^{13}$ with grounded contact 40, which short-circuits a portion of the resistance R. In portion 3 the engagement of the finger $b^{14}$ with the contact 42 short-circuits the entire resistance and leaves the motors in plain series. In passing from position 3 to position 4 there are two momentary positions, indicated at 3' and $3^2$. (See Fig. 2.) In the position 3' the overlapping engagement of the finger $b^5$ with the contact 15 short-circuits field F', and the finger $b^{17}$ by overlapping contacts 51 and 54 effects a similar short circuit of the field $F^3$. In the position $3^2$ fingers $b^4$ and $b^{16}$ lose engagement, respectively, with the contacts 9 and 48 and cut out the fields F' $F^3$. In position No. 4 fingers $b^3$ and $b^{15}$, respectively, engage the contacts 6 and 45, thus reconnecting in the fields F' $F^3$. These fields, however, are now respectively in parallel with the fields $F^2$ and $F^4$, since on each drum the current after passing through the armatures will divide between the fingers $b^7$ and $b^5$ or the fingers $b^{19}$ and $b^{17}$, the two branches after passing through the parallel fields reuniting in the upper group of contacts on each drum, as will be readily seen from Fig. 1 without again tracing the circuit in detail. At the time this position is reached the motors will have developed sufficient counter electromotive force to stand with safety the increased current due to the paralleling of the fields, and a corresponding increase in speed will result. Between positions 4 and 5 there are several intermediate positions which occur preparatory to connecting the motors in multiple-series pairs. In position 4' the only change made is the breaking of the circuit through the field $F^3$ by reason of the fact that the finger $b^{15}$ loses its engagement with the contact 45. In position $4^2$ this field is reconnected in circuit, but in series, with the field $F^4$ by reason of the fact that fingers $b^{16}$ and $b^{17}$ are lapping over into engagement with the contacts 49 and 52. Said field $F^3$ is, however, short-circuited, as the finger $b^{17}$ has not yet lost its engagement with the contact 54. In position $4^3$ the disengagement of finger $b^{17}$ with the contact 54 removes this short circuit around the field $F^3$, and at the same time the disengagement of the finger $b^{14}$ from the contact 42 and the engagement of the finger $b^{13}$ with the contact 40 put a portion of the resistance R back in circuit. In position $4^4$ the engagement of the finger $b^{25}$ (which has heretofore been idle) with the contact 72 short-circuits the drum C' and the two motors connected thereto, and at position $4^5$, which occurs momentarily thereafter, circuit is opened entirely on the drum C'. It was in anticipation of this removal from circuit and the subsequent connection in parallel with the other two motors that a portion of the resistance was put back into circuit at the position $4^3$, since otherwise a too-sudden jump in speed might occur. I do not, however, consider such use of resistance to be an absolute requisite at this time. In position 5 motors 1 and 2 are again put in circuit by the engagement of the fingers $b$ to $b^{12}$ with the contacts on the vertical line 5. The current after passing through the blow-out coil now divides, one branch of the circuit being as follows: finger $b^{12}$, contacts 38 35, finger $b^{11}$, to and through armature A', back to finger $b^8$, to contacts 26 29, finger $b^9$, armature $A^2$, finger $b^6$, contacts 19 and 23, finger $b^7$, field $F'$, finger $b^4$, contacts 10 and 13, finger $b^5$, field $F^2$, finger $b^2$, contacts 4 and 1, finger $b$, to resistance R, through a portion of the latter to finger $b^{13}$, to contact 41, to ground. The other branch of the circuit is to finger $b^{25}$, contacts 72 69, finger $b^{23}$, armature $A^3$, finger $b^{20}$, contacts 63 64, finger $b^{21}$, armature $A^4$, finger $b^{18}$, contacts 58 59, finger $b^{19}$, field $F^3$, finger $b^{16}$, contacts 49 52, finger $b^{17}$, field $F^4$, and through a portion of resistance to ground by the same path as the first-described branch. It will of course be understood that a part of each branch circuit is through the reversing and cut-out switch; but it was not thought necessary to again trace out in detail the connections through this switch. In position 6 the only change made is to remove that portion of the resistance which was before in circuit, this being effected by the engagement of the finger $b^{14}$ with the grounded contact 43. In position $6'$ fields $F'$ and $F^3$ are respectively short-circuited by the finger $b^4$ lapping onto the contact 16 and the finger $b^{17}$ lapping onto the contact 55. At position $6^2$ the fields $F'$ $F^3$ are removed from circuit by the brushes $b^4$ $b^{16}$ leaving the contacts 10 and 49, respectively. At position 7 the engagement of the brushes $b^3$ and $b^{15}$, respectively, with the contacts 7 and 46 reconnects in the fields $F'$ $F^3$ in multiple, respectively, with the fields $F^2$ $F^4$. At position $7'$ none of the fingers $b^{13}$ to $b^{25}$ are in engagement, the circuit to the motors 3 and 4 being open. At position $7^2$ motors 3 and 4 are again connected in circuit, with their armatures in multiple and their fields in series. The multiple connection of the armatures is effected by the fingers $b^{21}$, $b^{22}$, and $b^{23}$ engaging the contacts 70, 67, and 65, return connections being to fingers $b^{20}$ and $b^{18}$. The two branches of the circuit then unite and the current passes from contact 61 to finger $b^{19}$, to field $F^3$, to finger $b^{16}$, to contacts 50 53, to finger $b^{17}$, to field $F^4$, to ground through finger $b^{14}$ and grounded contact 44. At position $7^3$ the circuit is again opened on the drum $C'$ without disturbing the circuit of motors 3 and 4. At position 8 circuit is again closed on the drum $C'$, and the motors 1 and 2 are again connected in parallel with the motors 3 and 4, but with their armatures in parallel with each other and their fields in series. The circuit through the motors 1 and 2 can be readily followed in Fig. 1 without being traced in detail, the connections corresponding substantially with those just traced on the drum $C^2$. At position $8'$ armatures $A^2$ and $A^4$ are cut out by reason of the fact that the fingers $b^9$ and $b^{10}$ lose engagement with the contacts 30 and 32 and the fingers $b^{21}$ $b^{22}$ leave the contacts 65 and 67. Position $8^2$ leaves these armatures still cut out and also short-circuits their respective fields $F^2$ and $F^4$ by reason of the fact that the fingers $b^3$ and $b^{15}$ are lapping over, respectively, onto the contacts 8 and 47. At position $8^3$ fingers $b^5$ and $b^{17}$ lose engagement with the respective contacts 14 and 53, and thus cut out the said fields. At position 9, which is the final position, motors 2 and 4 are reconnected in circuit entirely in multiple with each other, and the four motors are also in full multiple with each other. It will be readily seen without tracing the circuits in detail that the engagement of the fingers $b^9$, $b^{10}$, and $b^{11}$ with the contacts 31, 33, and 36 effects the multiple connection of armatures $A'$ and $A^2$, while the similar engagement of the fingers $b^{22}$, $b^{23}$, and $b^{24}$ with the contacts 66, 68, and 70 effects the multiple connection of the armatures $A^3$ $A^4$; also, that the engagement of fingers $b^5$, $b^6$, $b^7$, and $b^8$ with the contacts 17, 20, 24, and 27 effects the paralleling of the fields $F'$ $F^2$, and the engagement of the fingers $b^{17}$, $b^{18}$, $b^{19}$, and $b^{20}$ with the contacts 56, 57, 61, and 62 effect the paralleling of the fields $F^3$ and $F^4$.

Inasmuch as in my method of control the motors are started all in series, it will be readily seen that their combined ohmic resistance is sufficiently great to prevent a very large inrush of current, so that comparatively little external resistance is required, or I may entirely omit the use of such resistance. There is therefore comparatively little useless expenditure of current. At the same time I gain the advantage at starting of a maximum torque. After position 3 is reached the next notch or running position is position 4, in which the paralleling of the fields effects a considerable acceleration in speed. All the intermediate positions between 4 and 5 are transitory positions, which are effected in rapid succession.

Positions 5 and 6 are running positions, and of course effect a further considerable acceleration in speed. The next running position is position 7. Positions $7'$, $7^2$, and $7^3$ are transitory positions, as are also positions $8'$, $8^2$, and $8^3$. Positions 7 and 8, it will be seen, afford a gradually-accelerating transition from position 6 to position 9, which is that of maximum speed.

For want of space not all the transitory positions are indicated in Fig. 1. These positions, moreover, while they are well adapted to the running positions to which they are preparatory, are not essential, since other preparatory circuit conditions might be employed.

By reference to the development of the reversing and cut-out switch, as shown in Fig. 1, it will be noted that when said switch is thrown to either of the positions "1 and 2 back" or "1 and 2 ahead" the circuit will be opened at fingers $s^4$, $s^5$, $s^6$, and $s^7$ and also at fingers $s^{12}$ $s^{13}$ $s^{14}$ $s^{15}$ $s^{16}$, so that the only contacts on the drum $C^2$ which are in use at this position are those in the upper or resistance group. Likewise when the reversing-switch is in either of the positions "3 and 4 back" or "3 and 4 ahead" the circuit is broken at fingers $s$, $s'$, $s^2$, $s^3$, $s^9$, $s^{10}$, $s^{11}$, $s^{16}$, and $s^{17}$, so that the only contacts of the drum $C'$ which are in use are those of the bottom group, which control the trolley connection to the drum C² in its series positions. By this arrangement of the reversing and cut-out switch I am able to effect the various circuit combinations above described with one set of resistance-contacts, which are used with all the motors, and also with either pair alone in circuit, and am also enabled to simplify the contacts for controlling the trolley connections.

I do not desire to limit myself to the exact construction and arrangement which I have herein shown and described, since it is obvious that persons skilled in the art can readily change or modify the same without departing from the spirit and scope of my invention as it is pointed out in the appended claims.

Having thus described my invention, what I claim, and desire to secure by Letters Patent, is—

1. A controller for electric motors, having a plurality of main controlling elements arranged each to control one group of motors, means for connecting said elements either in series or in parallel with each other, and contacts on each element for connecting the motors of its group both in series and in parallel, and also for connecting certain elements of said motors in parallel with each other and in series with the remaining elements.

2. A controller for electric motors, having groups of contacts, each of which groups is arranged to control one group of motors, and means for connecting said group of contacts either in series or in parallel, the contacts of each group being individually arranged in their group to connect in different positions thereof respectively the motors of its group all in series, all in parallel, with the fields in parallel with each other and in series with the armature, and the armatures in parallel with each other and in series with the fields.

3. A controller for electric motors having a plurality of groups of contacts, a group of motors connected to certain contacts of each group of contacts, means for varying the connection and relative engagement of the contacts of each group to connect the individual motors of the corresponding group all in series, all in parallel, and also with either their fields or their armatures only in parallel, and means for varying at predetermined times the relative electrical connections of the contact groups as a whole.

4. A controller for electric motors, having a plurality of groups of contacts, a group of motors connected with certain contacts of each group of contacts, and means for connecting the groups of contacts in series and in parallel, the contacts of each group being arranged to connect the motors of the corresponding group in series and also with their fields in parallel, and their armatures in series, while the groups of contacts are series-connected, and to repeat the said circuit conditions and also connect the armatures of each motor group in parallel and their fields in series and also the motors as a whole in parallel when the contact groups are connected in parallel.

5. A controller for electric motors, having a plurality of groups of contacts, a group of motors connected with certain contacts of each group of contacts, and means for connecting the groups of contacts in series and in parallel, the contacts of each group being arranged to connect the motors of the corresponding group in series and also with their fields in parallel and their armatures in series while the groups of contacts are series-connected, and to repeat the said circuit conditions and also connect the armatures of each motor group in parallel and their fields in series, and also their motors as a whole in parallel when the contact groups are connected in parallel, the parallel connection of the armatures alone being effected in one group in advance of a similar connection to the other group or groups.

6. A controller for electric motors, having a plurality of groups of coöperative fixed and movable contacts and means for connecting said groups either in series or in parallel, a group of motors arranged to be controlled by each group of contacts, said contacts having two separate relative positions in which the motors of the corresponding groups are connected in series, two separate positions in which the armatures are connected in series and the fields in parallel, a fifth position in which the fields are connected in series, and a sixth position in which the motors of the group as a whole are connected in parallel, and means for shifting the connection of the groups of contacts themselves from series to parallel relation intermediate the first parallel connection of the fields alone and the second series connection of the motors as a whole.

7. A controller for electric motors, having a plurality of groups of coöperative fixed and movable contacts and means for connecting said groups either in series or in parallel, a group of motors arranged to be controlled by each group of contacts, said contacts having two separate relative positions in which the motors of the corresponding group are connected in series, two separate positions in which the armatures are connected in series and the fields in parallel, a fifth position in which the fields are connected in series, and a sixth position in which the motors of the group as a whole are connected in parallel, said contacts also having other intermediate positions in which the fields or the armatures of its motor group or the group as a whole are temporarily removed from circuit, and means for shifting the connections of the contact groups themselves from series to parallel relation intermediate the first parallel connection of the fields alone and the second series connection of the motors as a whole.

8. In a controller for electric motors, the combination with two groups of electric motors, of two rotary intergeared controller-drums, each of which is provided with a group of contacts for controlling the motors of one motor group, said drums each having two positions in which the contacts thereof connect the motors of its corresponding group in series, two positions in which the fields of said group are connected in parallel and the armatures in series, a fifth position in which the armatures are connected in parallel and the fields in series, and a sixth position in which the motors of said group are all connected in parallel, and means for connecting the said drums either in series or in parallel, and for changing the connection from series to parallel intermediate the position of the first parallel connection of the fields and the position of the second series connection of the motors.

9. In a motor-controller, the combination with two controller-drums, each of which is provided with contacts and connections for controlling one pair of motors, of a reversing-switch arranged to reverse the direction of the motors, and also to cut out either pair thereof without entirely cutting out of circuit the contacts of the corresponding controller-drum.

10. In a motor-controller, the combination with two controller-drums each of which is provided with contacts and connections for the series-parallel control of one pair of motors, external resistance for use with either one or both pairs of motors, a group of contacts on one of said drums which determine the connection of said resistance, a group of contacts on the other drum which controls the trolley connection to the first-named drum in its series position, and an auxiliary switch arranged to reverse the motors and also to cut out of circuit either pair of motors and the series-paralleling contacts of the corresponding drum, but having contacts for preserving the circuit connections of the resistance-controlling contacts of one drum when the corresponding motors are removed from circuit, and for preserving the circuit connections of the trolley-controlling contacts of the other drum when its motors are removed from circuit.

In testimony whereof I have affixed my signature in presence of two witnesses.

EMMETT W. STULL.

Witnesses:
BLANCHE M. SMITH,
H. W. SMITH.